(12) United States Patent
Lee et al.

(10) Patent No.: US 8,293,851 B2
(45) Date of Patent: Oct. 23, 2012

(54) CROSSLINKABLE SULFONATED COPOLYMER AND FUEL CELL INCLUDING POLYMERIC COMPOSITION OF THE SAME

(75) Inventors: Jae-Jun Lee, Yongin-si (KR); Do-yun Kim, Yongin-si (KR); Sang-kook Mah, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/098,229

(22) Filed: Apr. 29, 2011

(65) Prior Publication Data

US 2011/0213103 A1 Sep. 1, 2011

Related U.S. Application Data

(62) Division of application No. 11/603,382, filed on Nov. 21, 2006, now Pat. No. 7,964,676.

(30) Foreign Application Priority Data

Feb. 22, 2006 (KR) .......................... 10-2006-0017241

(51) Int. Cl.
*C08G 75/24* (2006.01)
*C08L 81/08* (2006.01)
*C08G 14/00* (2006.01)
*C08G 14/04* (2006.01)
*H01M 4/00* (2006.01)

(52) U.S. Cl. .................. 525/535; 525/330.9; 525/328.5; 525/331.8; 528/150; 528/373; 528/378; 528/391

(58) Field of Classification Search .................. 525/535, 525/330.9, 328.5, 331.8; 528/150, 373, 378, 528/391

See application file for complete search history.

(56) References Cited

U.S. PATENT DOCUMENTS

| | | |
|---|---|---|
| 2004/0191602 A1 | 9/2004 | Ishikawa et al. |
| 2005/0113528 A1 | 5/2005 | Jing et al. |
| 2005/0131096 A1 | 6/2005 | Jing et al. |
| 2008/0286627 A1 | 11/2008 | Kubota et al. |

FOREIGN PATENT DOCUMENTS

| | | |
|---|---|---|
| CN | 1206503 A | 1/1999 |
| CN | 1482161 A | 3/2004 |
| JP | 59-012930 | 1/1984 |
| JP | 2003-217343 | 7/2003 |
| JP | 2003-292609 | 10/2003 |
| JP | 2003-335835 | 11/2003 |
| JP | 2004-010677 | 1/2004 |
| JP | 2005-264008 | 9/2005 |
| JP | 2006-104382 | 4/2006 |
| WO | WO 97/24777 | 7/1997 |
| WO | WO 03/033566 A1 | 4/2003 |
| WO | WO 2006/004098 A1 | 1/2006 |

OTHER PUBLICATIONS

Partial English translation of Japanese publication 59-12930 listed above.

(Continued)

*Primary Examiner* — Duc Truong
(74) *Attorney, Agent, or Firm* — Christie, Parker & Hale, LLP

(57) ABSTRACT

A sulfonated copolymer including a crosslinking functional group and a fuel cell including a polymer composition of the same are provided. The sulfonated copolymer including a crosslinking functional group can remarkably reduce methanol crossover and maintain superior dimensional stability and ionic conductivity by reducing swelling.

10 Claims, 1 Drawing Sheet

OTHER PUBLICATIONS

Ishikawa et al; Manufacture—for fuel cells; 2004; Mitsui Chemicals Inc., Japan; Chem Abstract 140:114193.
Ishikawa et al; Sulfonate group—membranes; 2003; Mitsui Chemicals Inc., Japan; Chem Abstract 140:7146.
Ishikawa et al; Crosslinkable—using the same; 2003; Mitsui Chemicals Inc., Japan; Chem Abstract 138:339060.
Chinese Registration Determination Certificate dated Aug. 29, 2007, for corresponding Chinese application 200610162783.9, with English Abstract.
Japanese Office action dated Nov. 10, 2009, for corresponding Japanese application 2007-042757, noting listed references in this IDS.
SIPO Patent Certificate dated Jan. 31, 2010 for corresponding Chinese patent application No. 2006-10162783.9, with partial English translation, 32 pgs.
Japanese Office action dated May 25, 2010, for corresponding Japanese Patent application 2007-042757, noting Japanese references filed in this IDS.
English translation of Japanese Office action dated May 25, 2010, for corresponding Japanese Patent application 2007-042757, noting Japanese references filed in this IDS.

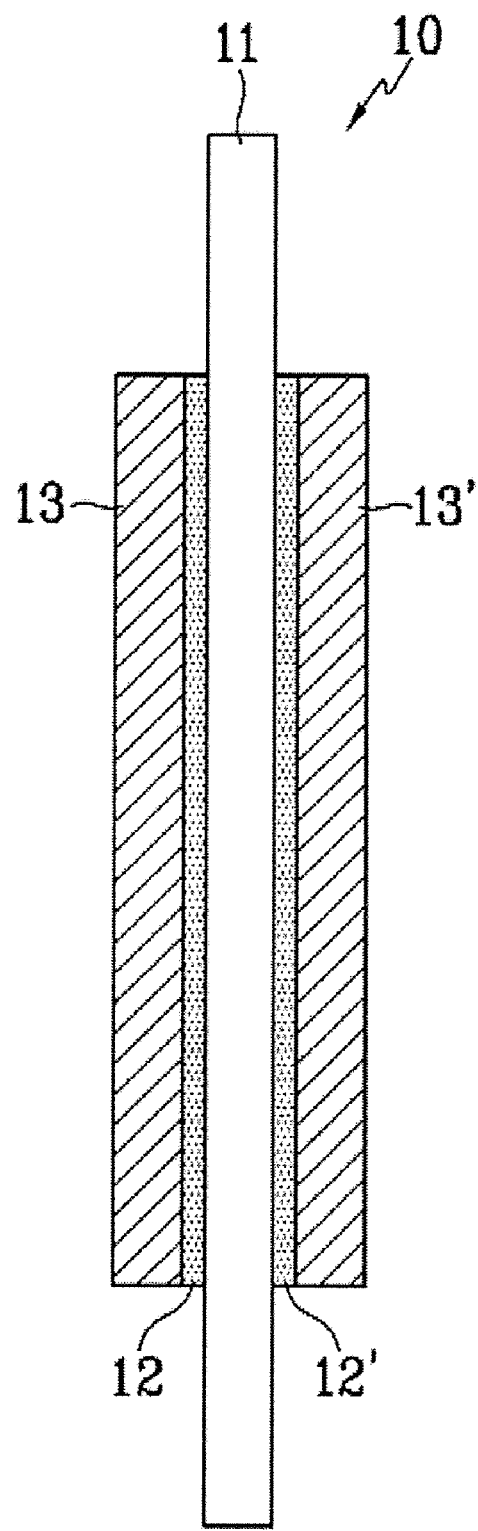

CROSSLINKABLE SULFONATED COPOLYMER AND FUEL CELL INCLUDING POLYMERIC COMPOSITION OF THE SAME

CROSS-REFERENCE TO RELATED APPLICATION(S)

This application is a divisional of U.S. patent application Ser. No. 11/603,382 filed on Nov. 21, 2006, now U.S. Pat. No. 7,964,676 which claims priority to and the benefit of Korean Patent Application No. 10-2006-0017241, filed on Feb. 22, 2006, in the Korean Intellectual Property Office, the disclosure of which is incorporated herein in its entirety by reference.

BACKGROUND OF THE INVENTION

1. Field of the Invention

The present invention relates to a crosslinkable sulfonated copolymer and a fuel cell including a polymeric composition of the same.

2. Description of the Related Art

Fuel cells are electrochemical devices which directly transform chemical energy between hydrogen and oxygen which are contained in hydrocarbon materials such as methanol, ethanol, and natural gas into electrical energy. The energy transformation process of fuel cells is very efficient and environmentally-friendly, thereby drawing attention for the past few years.

Fuel cells can be classified into Phosphoric Acid Fuel Cells (PAFC), Molten Carbonate Fuel Cells (MCFC), Solid Oxide Full Cells (SOFC), Polymer Electrolyte Membrane Fuel Cells (PEMFC), and Alkaline Full Cells (AFC) according to the type of electrolyte used. All fuel cells operate on the same principle, but the type of fuel used, operating speed, the catalyst used, and the electrolyte used are different. In particular, PEMFCs are capable of being used in small-sized stationary power generation equipment or transportation systems due to their high reaction speed, low operating temperature, high output density, rapid start-up, and output request variation.

The core part of a PEMFC is a Membrane and Electrode Assembly (MEA). A MEA comprises a polymer electrolyte membrane and two electrodes on either side of the polymer electrolyte membrane, which independently act as a cathode and an anode.

The polymer electrolyte membrane acts as a separator, blocking direct contact between an oxidizing agent and a reducing agent, and electrically insulates the two electrodes while conducting protons. Accordingly, a good polymer electrolyte membrane has high proton conductivity, good electrical insulation, low reactant permeability, excellent thermal, chemical and mechanical stability under normal fuel cell conditions, and a reasonable price.

In order to meet these requirements, various types of polymer electrolyte membranes have been developed, and, in particular, a highly fluorinated polysulfonic acid membranes such as a NAFION™ membrane, have been developed due to their excellent durability and performance. However, a NAFION™ membrane needs to be sufficiently moisturized and used at 80° C. or less to prevent moisture loss.

Moreover, in a Direct Methanol Fuel Cell (DMFC), an aqueous methanol solution is supplied as a fuel to the anode and a portion of non-reactive aqueous methanol solution is permeated to the polymer electrolyte membrane. The non-reactive aqueous methanol solution that permeates to the polymer electrolyte membrane causes a swelling phenomenon in the polymer electrolyte membrane, and the swelling is diffused affecting a cathode catalyst layer. Such a phenomenon is referred to as 'methanol crossover', that is, the direct oxidization of methanol at the cathode where an electrochemical reduction of hydrogen ions and oxygen occurs, and thus a methanol crossover results in a drop in electric potential, thus causing a decline in the performance of the DMFC.

This issue is common in other fuel cells using a liquid fuel such as a polar organic fuel.

SUMMARY OF THE INVENTION

One embodiment of the present invention provides a sulfonated copolymer including a crosslinking functional group which has excellent ionic conductivity and can remarkably reduce methanol crossover.

Another embodiment of the present invention also provides a method of preparing the sulfonated copolymer including the crosslinking functional group.

An embodiment of the present invention also provides a polymer resulting from the polymerization of the sulfonated copolymer.

One embodiment of the present invention also provides a polymer electrolyte membrane which can remarkably reduce methanol crossover without sacrificing ionic conductivity and has improved dimensional stability.

An embodiment of the present invention also provides a membrane electrode assembly including the polymer resulting from the polymerization of the sulfonated copolymer.

A further embodiment of the present invention also provides a fuel cell including the polymer resulting from the polymerization of the sulfonated copolymer.

According to an embodiment of the present invention, a crosslinkable sulfonated copolymer is provided, including a polymerizable unsaturated functional group at one end or both ends thereof, the crosslinkable sulfonated copolymer including: at least one aromatic ether repeating unit; and an aromatic ether repeating unit including a sulfonic acid group or a sulfonate group.

According to an embodiment, the aromatic ether repeating unit including a sulfonic acid group or a sulfonate group is at least one of repeating units represented by Formulas 1 to 3 below, and the degree of polymerization is in the range of 3 to 1,000:

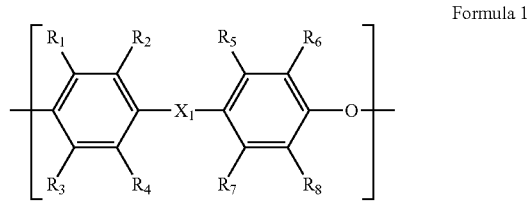

Formula 1 wherein, each of $R_1$ through $R_8$ is independently hydrogen, a $C_{1-10}$ alkyl group, or a $C_{6-30}$ aryl group, and at least one is $-SO_3Y$, wherein Y is hydrogen or an alkali metal; and $X_1$ is a single bond, $-O-$, $-S-$, $-(C=O)-$, $-SO_2-$, a substituted or unsubstituted $C_{6-30}$ arylene group, a substituted or unsubstituted $C_{1-20}$ alkylene group, a substituted or unsubstituted $C_{5-30}$ hetero arylene group, a substituted or unsubstituted $C_{1-20}$ heteroalkylene group, a substituted or unsubstituted $C_{6-30}$ alkylarylene group, a substituted or unsubstituted $C_{6-30}$ heteroalkylarylene group, a substituted or unsubstituted $C_{6-30}$ alkylheteroarylene group, a substituted or unsubstituted $C_{8-30}$ alkylarylalkylene group, or a substituted or unsubstituted $C_{13-30}$ arylalkylarylene group;

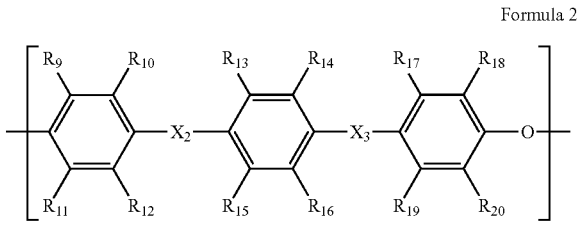

Formula 2 wherein, each of $R_9$ through $R_{20}$ is independently hydrogen, a substituted or unsubstituted $C_{1-10}$ alkyl group, or a substituted or unsubstituted $C_{6-30}$ aryl group, and at least one is —$SO_3Y$, wherein Y is hydrogen or an alkali metal; and each of $X_2$ and $X_3$ is a single bond, —O—, —S—, —(C=O)—, —$SO_2$—, a substituted or unsubstituted $C_{6-30}$ arylene group, a substituted or unsubstituted $C_{1-20}$ alkylene group, a substituted or unsubstituted $C_{5-30}$ heteroarylene group, a substituted or unsubstituted $C_{1-20}$ heteroalkylene group, a substituted or unsubstituted $C_{6-30}$ alkylarylene group, a substituted or unsubstituted $C_{6-30}$ heteroalkylarylene group, a substituted or unsubstituted $C_{6-30}$ alkylheteroarylene group, a substituted or unsubstituted $C_{8-30}$ alkylarylalkylene group, or a substituted or unsubstituted $C_{13-30}$ arylalkylarylene group;

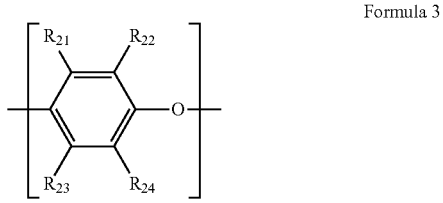

Formula 3 wherein, each of $R_{21}$ through $R_{24}$ is independently hydrogen, a substituted or unsubstituted $C_{1-10}$ alkyl group, or a substituted or unsubstituted $C_{6-30}$ aryl group, and at least one is —$SO_3Y$, wherein Y is hydrogen or an alkali metal.

The polymerizable unsaturated functional group may be one of (meth)acrylate, styryl, cinnamate, furfuryl, vinyl, acetylene, epoxy, and cyanate based functional groups.

According to another embodiment of the present invention, a method of preparing a crosslinkable sulfonated copolymer is provided including: condensation polymerization of at least one aromatic diol-, dinitro-, or dihalide-based monomer with an aromatic diol-, dinitro-, or dihalide-based monomer containing a sulfonic acid group or a sulfonate group; preparing sulfonated polyarylene ether having a hydroxyl group at ends thereof by adding the hydroxyl group at both ends of the result of the condensation polymerization; covalently bonding the hydroxyl group at the ends of the sulfonated polyarylene ether with a crosslinking derivative.

According to another embodiment of the present invention, a curing reaction product of the crosslinkable sulfonated copolymer described above is provided.

According to another embodiment of the present invention, a polymer electrolyte membrane including a curing reaction product of the crosslinkable sulfonated copolymer of above, or a polymer matrix and a curing reaction product of the crosslinkable sulfonated copolymer of above is provided.

According to another embodiment of the present invention, a membrane electrode assembly is provided including: a cathode including a catalyst layer and a diffusion layer; an anode including a catalyst layer and a diffusion layer; and a polymer electrolyte membrane interposed between the cathode and the anode, wherein the polymer electrolyte membrane includes a curing reaction product of the crosslinkable sulfonated copolymer of above.

According to another embodiment of the present invention, a fuel cell is provided including: a cathode including a catalyst layer and a diffusion layer; an anode including a catalyst layer and a diffusion layer; and a polymer electrolyte membrane interposed between the cathode and the anode, wherein the polymer electrolyte membrane includes a curing reaction product of the crosslinkable sulfonated copolymer of above.

BRIEF DESCRIPTION OF THE DRAWINGS

The above and other embodiments of the present invention will become more apparent by describing in detail exemplary embodiments thereof with reference to the attached drawing in which:

FIG. 1 is a schematic drawing of a membrane electrode assembly according to an embodiment of the invention.

DETAILED DESCRIPTION

A crosslinkable sulfonated copolymer according to an embodiment of the present invention includes a crosslinking functional group at both ends thereof. Thus, by using a polymeric compound prepared by curing the crosslinkable sulfonated copolymer, a polymer electrolyte membrane having high insolubility to water, low fuel crossover, such as methanol crossover, preventing swelling due to fuel at a high temperature, excellent dimensional stability, high ionic conductivity, and low deformability can be formed.

In an embodiment, the crosslinkable sulfonated copolymer includes a polymerizable unsaturated functional group at one end or both ends thereof, the crosslinkable sulfonated copolymer includes: at least one aromatic ether repeating unit; and an aromatic ether repeating unit containing a sulfonic acid group or a sulfonate group.

In one embodiment, the mole ratio of the at least one aromatic ether repeating unit and the aromatic ether repeating unit containing a sulfonic acid group or a sulfonate group may be in the range of 99:1 to 5:95, preferably in the range of 99:5 to 15:85, and more preferably in the range of 90:10 to 55:45. When the mole ratio of the aromatic ether repeating unit containing a sulfonic acid group or a sulfonate group is less than the above range, hydrogen ionic conductivity in a conductive membrane may deteriorate and membrane resistance may increase. When the mole ratio of the aromatic ether repeating unit containing a sulfonic acid group or a sulfonate group is greater than the above range, membrane efficiency may deteriorate due to high swelling and permeability caused by water and fuel such as methanol.

In an embodiment, the aromatic ether repeating unit including a sulfonic acid group or a sulfonate group is at least one selected from the group consisting of repeating units represented by Formulas 1 to 3 below, and the degree of polymerization is a number in the range of 3 to 1,000:

Formula 1

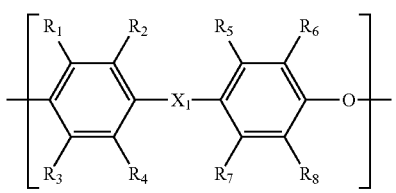

wherein, each of $R_1$ through $R_8$ is independently hydrogen, a $C_{1\text{-}10}$ alkyl group, or a $C_{6\text{-}30}$ aryl group, and at least one of $R_1$ through $R_8$ is —$SO_3Y$, wherein Y is hydrogen or an alkali metal; and $X_1$ is a single bond, —O—, —S—, —(C=O)—, —$SO_2$—, a substituted or unsubstituted $C_{6\text{-}30}$ arylene group, a substituted or unsubstituted $C_{1\text{-}20}$ alkylene group, a substituted or unsubstituted $C_{5\text{-}30}$ heteroarylene group, a substituted or unsubstituted $C_{1\text{-}20}$ heteroalkylene group, a substituted or unsubstituted $C_{6\text{-}30}$ alkylarylene group, a substituted or unsubstituted $C_{6\text{-}30}$ heteroalkylarylene group, a substituted or unsubstituted $C_{6\text{-}30}$ alkylheteroarylene group, a substituted or unsubstituted $C_{8\text{-}30}$ alkylarylalkylene group, or a substituted or unsubstituted $C_{13\text{-}30}$ arylalkylarylene group;

Formula 2

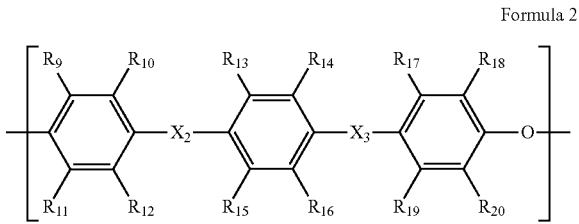

wherein, each of $R_9$ through $R_{20}$ is independently hydrogen, a substituted or unsubstituted $C_{1\text{-}10}$ alkyl group, or a substituted or unsubstituted $C_{6\text{-}30}$ aryl group, and at least one of $R_9$ through $R_{20}$ is —$SO_3Y$, wherein Y is hydrogen or an alkali metal; and each of $X_2$ and $X_3$ is a single bond, —O—, —S—, —(C=O)—, —$SO_2$—, a substituted or unsubstituted $C_{6\text{-}30}$ arylene group, a substituted or unsubstituted $C_{1\text{-}20}$ alkylene group, a substituted or unsubstituted $C_{5\text{-}30}$ heteroarylene group, a substituted or unsubstituted $C_{1\text{-}20}$ heteroalkylene group, a substituted or unsubstituted $C_{6\text{-}30}$ alkylarylene group, a substituted or unsubstituted $C_{6\text{-}30}$ heteroalkylarylene group, a substituted or unsubstituted $C_{6\text{-}30}$ alkylheteroarylene group, a substituted or unsubstituted $C_{8\text{-}30}$ alkylarylalkylene group, or a substituted or unsubstituted $C_{13\text{-}30}$ arylalkylarylene group;

Formula 3

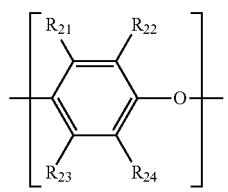

wherein, each of $R_{21}$ through $R_{24}$ is independently hydrogen, a substituted or unsubstituted $C_{1\text{-}10}$ alkyl group, or a substituted or unsubstituted $C_{6\text{-}30}$ aryl group, and at least one $R_{21}$ through $R_{24}$ is —$SO_3Y$, wherein Y is hydrogen or an alkali metal.

In one embodiment, the sulfonic acid group or the sulfonate group included in the repeating unit of any one of Formulas 1 to 3 can provide properties such as increased conductivity and improved thermal properties to the repeating unit. The sulfonate group, as a cation, includes an alkali metal, and examples are lithium, potassium sodium, etc.

In another embodiment, the mole ratio of the repeating unit of any one of Formulas 1 to 3 while forming a copolymer may be in the range of 0.01 to 0.95. When the mole ratio is greater than 0.95, the amount of the sulfonic acid group is too much, causing swelling due to fuel, high permeability, and deteriorated membrane properties. When the mole ratio is less than 0.01, conductivity decreases. A copolymer including such a repeating unit may be any one of a block copolymer and a random copolymer.

In one embodiment, the repeating unit of Formula 1 including the sulfonic acid group or the sulfonate group may have a structure, for example, represented by Formula 11 or 12:

Formula 11

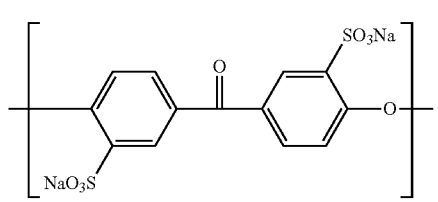

Formula 12

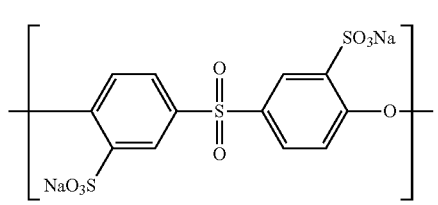

In one embodiment, the repeating unit of Formula 2 including the sulfonic acid group or the sulfonate group may have a structure, for example, represented by Formula 21:

Formula 21

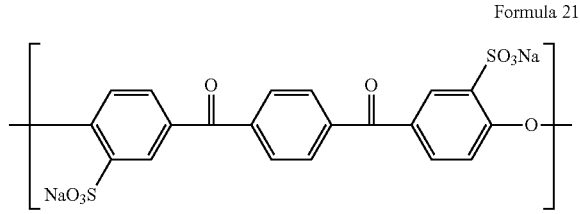

In another embodiment, the repeating unit of Formula 3 may have a structure represented by Formula 31:

Formula 31

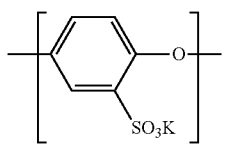

In an embodiment, the crosslinkable sulfonated copolymer includes a polymerizable unsaturated functional group at one end or both ends thereof which connect to another functional group in another chain to form a polymerization reaction product prepared by curing. Examples of the polymerizable unsaturated functional group are (meth)acrylate, styryl, cinnamate, furfuryl, vinyl, acetylene, epoxy, cyanate based functional group, etc., but the polymerizable unsaturated functional group is not limited thereto.

Besides including the repeating unit of any one of Formulas 1 to 3, the crosslinkable sulfonated copolymer may include at least one aromatic ether repeating unit which does not contain a sulfonic acid group or a sulfonate group. Such an aromatic ether repeating unit includes at least one aromatic ring in its backbone, and an ether group (—O—) at one end thereof. In an embodiment, the at least one aromatic ether repeating unit may be, for example, at least one selected from the group consisting of repeating units represented by Formulas (a) to (w) below:

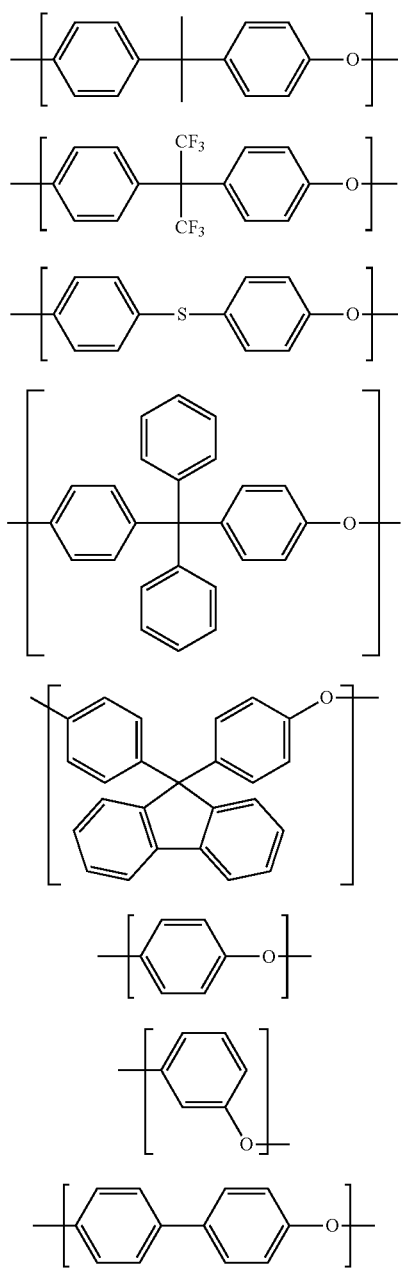

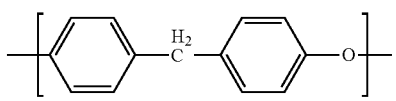

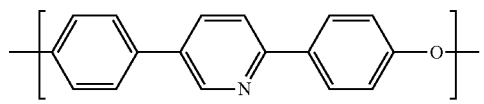

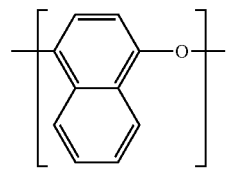

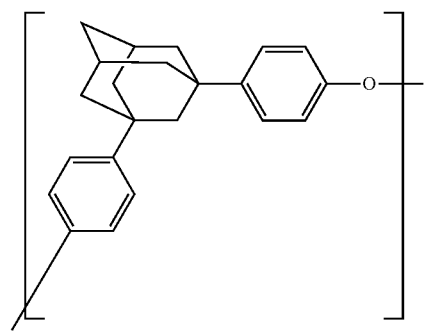

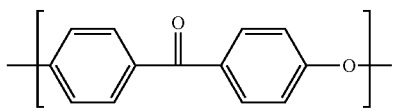

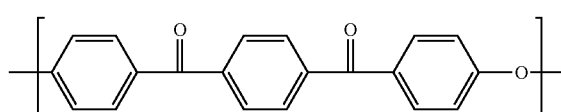

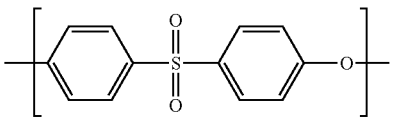

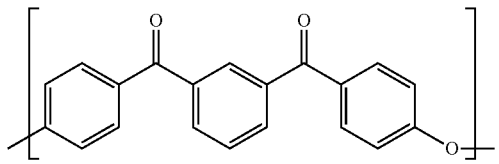

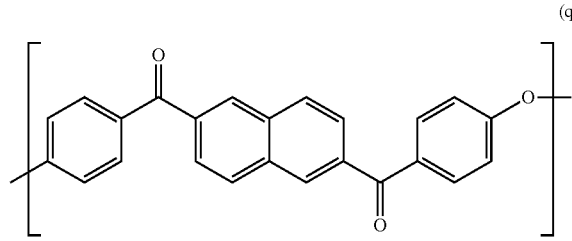

-continued

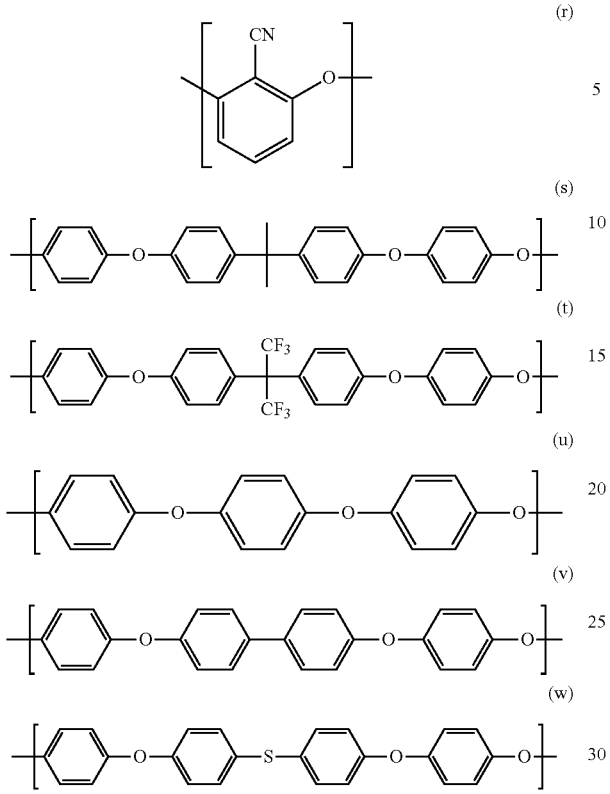

(r)

(s)

(t)

(u)

(v)

(w)

In one embodiment, the at least one aromatic ether repeating unit may be represented by Formula 4 below:

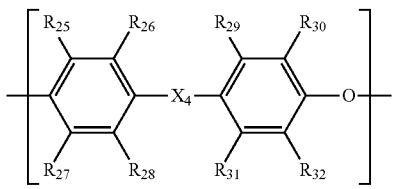

Formula 4 wherein, each of $R_{25}$ through $R_{32}$ is independently hydrogen, a substituted or unsubstituted $C_{1-10}$ alkyl group, or a substituted or unsubstituted $C_{6-30}$ aryl group; and $X_4$ is a single bond, —O—, —S—, —(C=O)—, —SO$_2$—, a substituted or unsubstituted $C_{1-10}$ alkylene group, a substituted or unsubstituted $C_{1-10}$ heteroalkylene group, a substituted or unsubstituted $C_{6-30}$ arylene group, or a substituted or unsubstituted $C_{5-30}$ heteroarylene group.

In an embodiment, the at least one aromatic ether repeating unit of Formula 4, for example, may be selected from the group consisting of repeating units represented by Formulas 41 to 43 below:

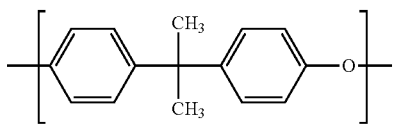

Formula 41

-continued

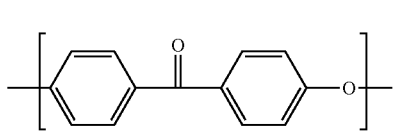

Formula 42

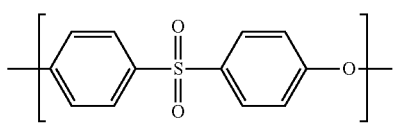

Formula 43

Hereinafter, a method of preparing the crosslinkable sulfonated copolymer will be described.

According to an embodiment, the crosslinkable sulfonated copolymer can be prepared by: condensation polymerization of at least one aromatic diol-, dinitro-, or dihalide-based monomer with an aromatic diol-, dinitro-, or dihalide-based monomer containing a sulfonic acid group or a sulfonate group; preparing sulfonated polyarylene ether having a hydroxyl group at ends thereof by adding the hydroxyl group at both ends of the polycondensate; covalently bonding the hydroxyl group at the ends of the sulfonated polyarylene ether with a crosslinking derivative.

The condensation polymerization may use any general polymer preparation method, and is not specifically limited. For example, first, the at least one aromatic diol-, dinitro-, or dihalide-based monomer and the aromatic diol-, dinitro-, or dihalide-based monomoer containing a sulfonic acid group or a sulfonate group are mixed in an appropriate ratio. Next, in an embodiment, the mixture is dissolved in a solvent, polymerized with a metallic base salt catalyst such as potassium carbonate ($K_2CO_3$) to form a copolymer in a sulfonate group state. In one embodiment, the polymerization may be performed at a temperature in the range of 140 to 220° C. for a time in the range of 1 to 36 hours.

The at least one aromatic diol-, dinitro-, or dihalide-based monomer is not limited as long it is an aromatic ring compound having at least two reactive functional groups. For example, the at least one aromatic diol-, dinitro-, or dihalide-based monomer may be a compound of any one of Formulas (a) to (w) below:

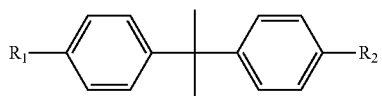

(a)

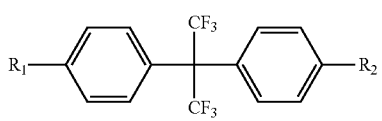

(b)

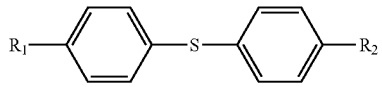

(c)

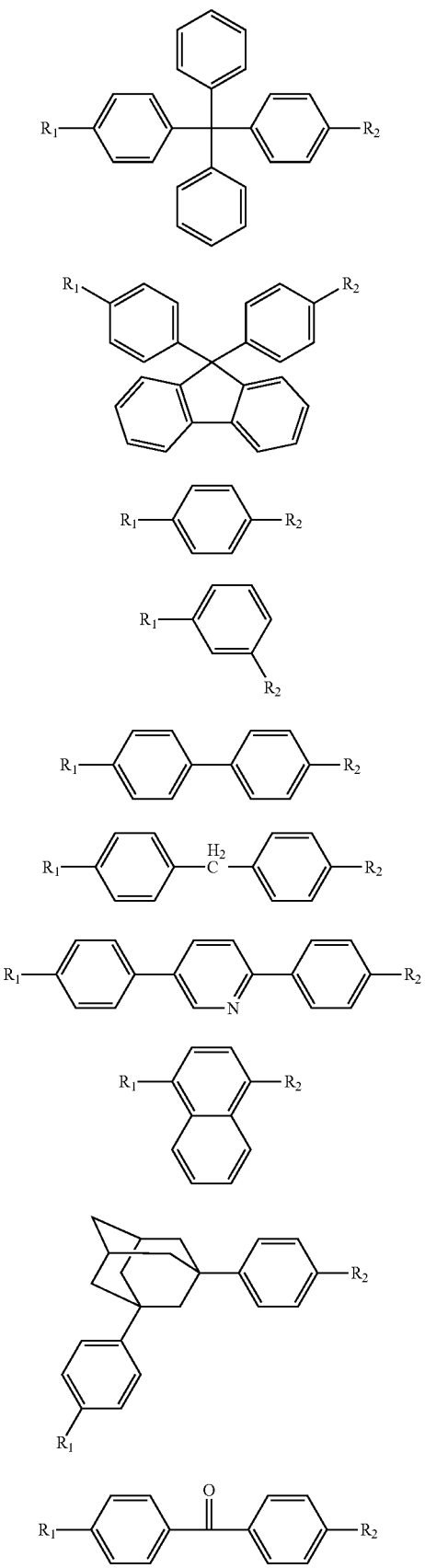
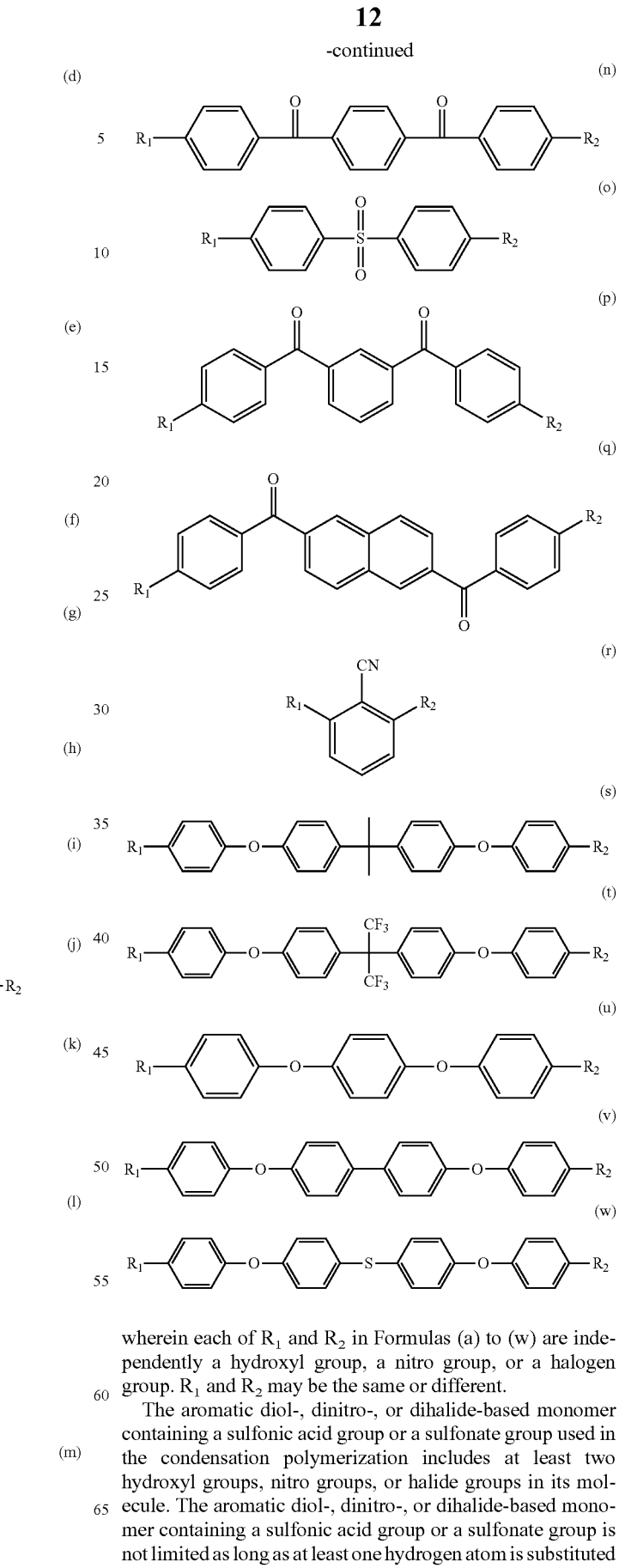

wherein each of $R_1$ and $R_2$ in Formulas (a) to (w) are independently a hydroxyl group, a nitro group, or a halogen group. $R_1$ and $R_2$ may be the same or different.

The aromatic diol-, dinitro-, or dihalide-based monomer containing a sulfonic acid group or a sulfonate group used in the condensation polymerization includes at least two hydroxyl groups, nitro groups, or halide groups in its molecule. The aromatic diol-, dinitro-, or dihalide-based monomer containing a sulfonic acid group or a sulfonate group is not limited as long as at least one hydrogen atom is substituted with a sulfonic acid group or a sulfonate group. For example, the aromatic diol-, dinitro-, or dihalide-based monomer containing a sulfonic acid group or a sulfonate group may be at least one selected from the group consisting of compounds having a structure represented by Formulas 1a to 3a.

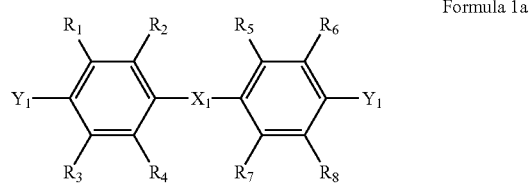

Formula 1a

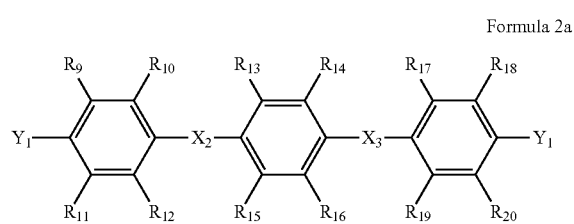

Formula 2a

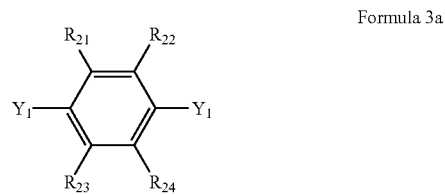

Formula 3a wherein $X_1$, $X_2$, $X_3$, $R_1$ through $R_{24}$ are as described above; and $Y_1$ is a hydroxyl group, a nitro group, or a halide group.

In the method of preparing the crosslinkable sulfonated copolymer, the hydroxyl group in the aromatic diol-based monomer reacts with the halogen group or the nitro group. In an embodiment, the mole ratio of the hydroxyl group and the nitro or halogen group may be in the range of 4.0:6.0 to 6.0:4.0, preferably in the range of 4.8:5.2 to 5.2:4.8, and more preferably, 5.0:5.0. If the mole ratio is outside the above range, a non-reactive monomer and a polymer having low molecular weight are formed, which adversely effect the properties of the crosslinkable sulfonated copolymer.

Also, in an embodiment the mole ratio between the aromatic diol-, dinitro-, or dihalide-based monomer and the aromatic diol-, dinitro-, or dihalide-based monomer containing a sulfonic acid group or a sulfonate group may be in the range of 99:1 to 5:95, preferably in the range of 95:5 to 15:85, and more preferably in the range of 90:10 to 55:45. When the mole ratio of the aromatic diol-, dinitro-, or dihalide-based monomer containing a sulfonic acid group or a sulfonate group is less than 99:1, hydrogen ionic conductivity in a conductive membrane deteriorates and membrane resistance may remarkably increase. When the mole ratio of the aromatic diol-, dinitro-, or dihalide-based monomer containing a sulfonic acid group or a sulfonate group is greater than 5:95, membrane efficiency may deteriorate due to increased swelling and permeability due to water and fuel such as methanol.

However, when the compound containing the sulfonate is used to form a copolymer, a monovalent proton needs to be substituted with a hydrogen ion to provide ionic conductivity to the copolymer. During substitution, a strong acid, such as dilute hydrochloric acid or dilute sulfuric acid, may be used.

After the condensation polymerization, the copolymer has the hydroxyl group at its end. Here, a crosslinking functional group is covalently bonded to obtain the crosslinkable sulfonated copolymer. The covalent bonding is performed in the presence of base such as NaH or amine at an ambient temperature or a heating temperature of a reaction solution, using a (meta)acrylate-based compound, a styryl-based compound, a cinnamate-based compound, a cyanate-based compound, an epoxy-based compound, or a vinyl-based compound. Finally, a crosslinkable sulfonated copolymer represented by Formula 10 below, having a substituted polymerizable unsaturated functional group for hydrogen in the hydroxyl group can be obtained.

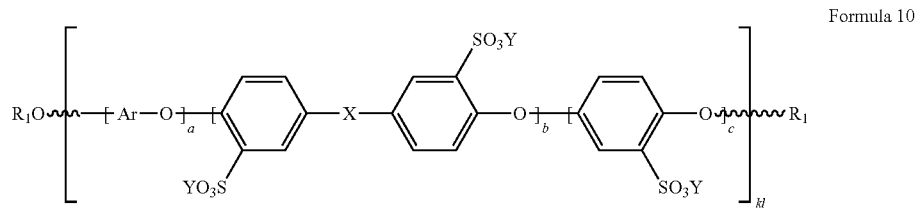

Formula 10 wherein $R_1$ is a polymerizable unsaturated functional group; Y is hydrogen or an alkali metal; —Ar—O— is an aromatic ether repeating unit; X is a single bond, —O—, —S—, —(C=O)—, —SO$_2$—, a substituted or unsubstituted $C_{6-30}$ arylene group, a substituted or unsubstituted $C_{1-20}$ alkylene group, a substituted or unsubstituted $C_{5-30}$ heteroarylene group, a substituted or unsubstituted $C_{1-20}$ heteroalkylene group, a substituted or unsubstituted $C_{6-30}$ alkylarylene group, a substituted or unsubstituted $C_{6-30}$ heteroalkylarylene group, a substituted or unsubstituted $C_{6-30}$ alkylheteroarylene group, a substituted or unsubstituted $C_{8-30}$ alkylarylalkylene group, or a substituted or unsubstituted $C_{13-30}$ arylalkylarylene group; a is a number in the range of 0.01 to 0.99; b and c are numbers in the range of 0 to 0.99, wherein a+b+c=1 and b+c>0.01; and k1 is a number in the range of 3 to 1,000.

The crosslinkable sulfonated copolymer forms a polymer electrolyte membrane by curing, with a polymer matrix when required. The curing may be performed using heat, light, or electron beams, but is not limited as any conventional curing method may be used. In one embodiment, when the curing is performed using heat, the temperature may be in the range of 40 to 120° C. When light is used, ultraviolet rays may be used.

In an embodiment, the curing may be performed by adding a polymerization initiator, and the polymerization initiator may be at least one selected from the group consisting of benzoin ethyl ether, benzyldimethylketal, diethoxyacetophenone, and AIBN. In another embodiment, the amount of the polymerization initiator may be in the range of 0.01 to 10 parts by weight based on 100 parts by weight of the crosslinkable sulfonated copolymer.

The polymer matrix is not limited as long as it is a polymer matrix conventionally used to form a polymer electrolyte membrane. Examples of the polymer matrix include sulfonated polyetheretherketone (SPEEK), sulfonated polyetherethersulfone (SPEES), sulfonated polyimide (SPI), polyimide, polybenzimidazole, polyethersulfone, polyetheretherketone, etc.

The polymer electrolyte membrane according to an embodiment of the present invention may have an interpenetration (IPN) structure of a cured product of the crosslinkable sulfonated copolymer and another polymer. The other polymer may be selected considering the properties that need to improve in the cured product of the crosslinkable sulfonated copolymer. For example, when ionic conductivity needs to be improved, a polymer having excellent ionic conductivity can be used.

A polymer electrolyte membrane according to another embodiment of the present invention, for example, may be impregnated with an ionic conductive material, such as phosphoric acid. Any impregnation methods that are well known to those of ordinary skill in the art may be used, and an example may be digesting the crosslinking sulfonated copolymer membrane in phosphoric acid.

According to another embodiment of the present invention, the polymer electrolyte membrane may have a laminated structure of a polymer membrane formed of a cured product of the crosslinkable sulfonated copolymer and another polymer membrane in a plurality of layers. The other polymer membrane may be formed of any polymer electrolyte membrane materials well known to those of ordinary skill in the art, based on the properties that need to improve in the cured product of the crosslinkable sulfonated copolymer.

The polymer electrolyte membrane including the cured product of the crosslinkable sulfonated copolymer according to an embodiment of the present invention has properties such as improved mechanical properties of the membrane and insolubility to water, due to increased molecular weight caused by crosslinking between polymer chains. Hence, the polymer electrolyte membrane including the cured product of the crosslinkable sulfonated copolymer can prevent swelling caused by fuel, even when the sulfonic acid group has high conductivity.

In one embodiment, the present invention provides a membrane electrode assembly including: a cathode including a catalyst layer and a diffusion layer; an anode including a catalyst layer and a diffusion layer; and a polymer electrolyte membrane interposed between the cathode and the anode, wherein the polymer electrolyte membrane includes a cured product of the crosslinkable sulfonated copolymer of the present invention.

In one embodiment, referring to FIG. 1, the membrane-electrode assembly 10 includes a polymer electrolyte membrane 11, catalyst layers 12, 12', and gas diffusion layers 13, 13' disposed on the outside surfaces of the catalyst layers 12, 12'.

The cathode and the anode may be formed of materials well known to those of ordinary skill in the art. Also, the polymer electrolyte membrane includes a cured product of the crosslinkable sulfonated copolymer of the present invention. The polymer electrolyte membrane may be used alone or in combination with other membranes having ionic conductivity.

In an embodiment, a fuel cell is provided including: a cathode including a catalyst layer and a diffusion layer; an anode including a catalyst layer and a diffusion layer; and a polymer electrolyte membrane interposed between the cathode and the anode, wherein the polymer electrolyte membrane includes a cured product of the crosslinkable sulfonated copolymer of the present invention.

The cathode and the anode may be formed of materials well known to those of ordinary skill in the art. Also, the polymer electrolyte membrane includes a cured product of the crosslinkable sulfonated copolymer of the present invention. The polymer electrolyte membrane may be used alone or in combination with other membranes having ionic conductivity.

Conventional methods of preparing a fuel cell disclosed in various documents can be used when preparing such a fuel cell, and thus detailed descriptions thereof are omitted.

The present invention will be described in greater detail with reference to the following examples. The following examples are for illustrative purposes and are not intended to limit the scope of the invention.

EXAMPLE 1

Reaction Formula 1

HO—⟨⟩—C(CH$_3$)$_2$—⟨⟩—OH + F—⟨⟩—CO—⟨⟩—F + F—⟨⟩(NaO$_3$S)—CO—⟨⟩(SO$_3$Na)—F

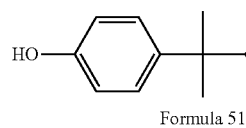
Formula 51

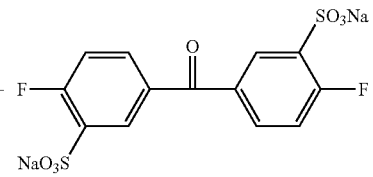
Formula 52

Formula 53

K$_2$CO$_3$/DMSO
1) 140° C./4 hr
2) 180° C./16 hr
excessive BPA

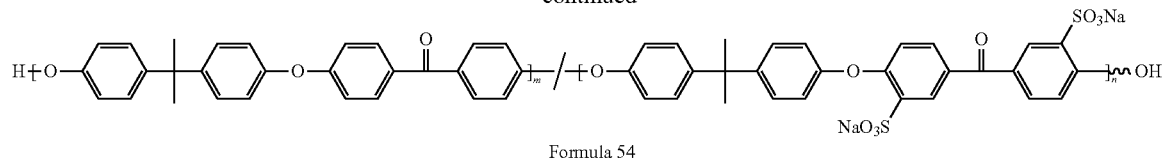

Formula 54

NaH, methacryloyl chloride
room temperature, 12 hrs

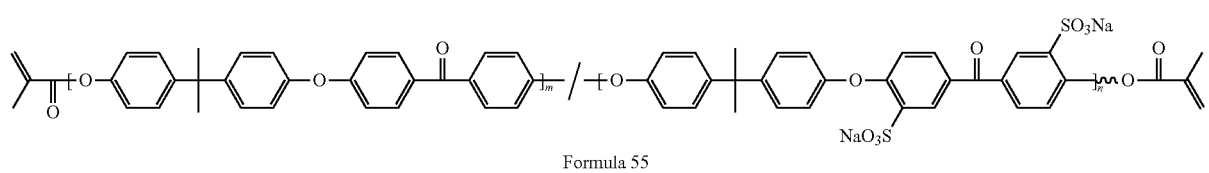

Formula 55 wherein, the mole ratio m/n=1/1.

As shown in Reaction Formula 1, 5.406 g (23.68 mmol) of diol compound of Formula 51, 2.583 g (11.84 mmol) of dihalide compound of Formula 52, 5.000 g (11.84 mmol) of dihalide compound containing sulfonic acid salt of Formula 53, and 4.25 g of anhydrous $K_2CO_3$ were injected into a 250 ml three-neck flask equipped with Dean-Stark trap. Then, 65 ml of dimethylsulfoxide and 30 ml of toluene were added to the 250 ml three-neck flask and mixed as a solvent.

The mixture was refluxed with nitrogen at 140° C. for 4 hours, and then water generated was removed. After removing water, toluene was removed. The reaction temperature was increased to 180° C., and at 180° C., polymerization was performed for 16 hours. Subsequently, 0.54 g (2.368 mmol) of diol compound of Formula 51 and 30 ml of toluene were added to the resultant and then a reflux reaction was additionally performed for 12 hours. Accordingly, a sulfonated copolymer of Formula 54 having hydroxyl groups at both ends thereof was obtained.

The sulfonated copolymer of Formula 54 was cooled down to an ambient temperature, and then precipitated into methanol. To remove inorganic matter, the precipitated sulfonated copolymer was washed with hot water three times. Finally, the copolymer obtained was dried at 100° C. for 24 hours.

EXAMPLE 2

5 g of sulfonated copolymer of Formula 54 obtained from Example 1 was dissolved in 30 ml of dried 1-methyl-2-pyrrolidinone with nitrogen, and then 1.42 g of NaH (60% dispersion in mineral oil) was added thereto. The result was stirred for 6 hours at an ambient temperature, and then cooled down using ice water. Subsequently, 5.4 g of methacryloyl chloride was slowly added to the result. Then, the reaction was performed for 12 hours at the ambient temperature. The reaction precipitate was separated through a glass filter, and then the filtrate was precipitated into a mixed solution of methanol and water. Next, the resultant was dried under a vacuum to obtain a methacrylic end-capped crosslinkable sulfonated polyetheretherketone copolymer of Formula 55 above. The structure of the methacrylic end-capped crosslinkable sulfonated polyetheretherketone copolymer was analyzed using nuclear magnetic resonance, and a characteristic peak of the methacryl group was confirmed as below.

1H NMR (DMSO-d6) (300 MHz) data: δ 5.8~6.2 (2H, H2C=C—) and 2.0 (3H, C=C—CH3) (Mw=82,000, Mn=52,000)

EXAMPLES 3 TO 5

The crosslinkable sulfonated copolymer of Formula 54 obtained from Example 2 and a copolymer of any one of Formulas 61 or 62 were completely dissolved in dimethylsulfoxide shown in Table 1, and the resulting mixture was cast onto a glass plate. Accordingly, the result was dried in an oven at 60° C. for 12 hours to prepare a polymer electrolyte membrane. Next, the polymer electrolyte membrane was soaked in 1.5 M sulfuric acid solution for 24 hours for protonation. Subsequently, the product was immersed in distilled water for 24 hours to obtain polymer membranes having the thickness shown in Table 1 below.

Formula 61

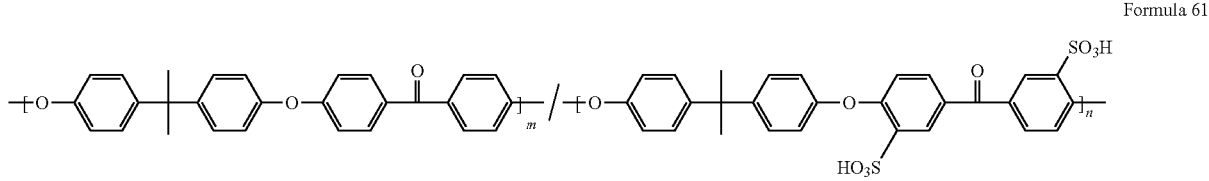

wherein, m/n=4/1.

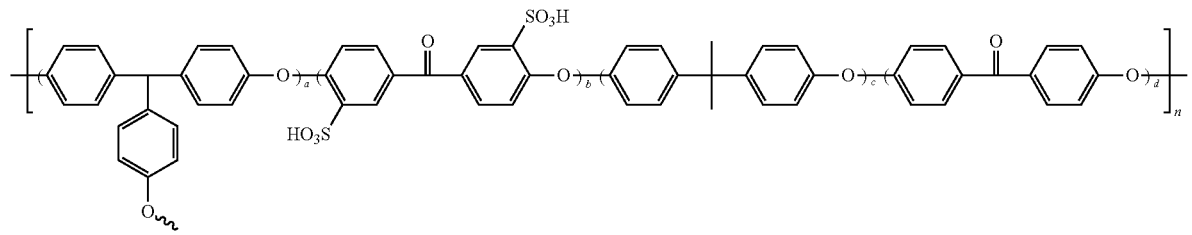

Formula 62 wherein, a/c=5/95 and b/d=33.3/66.6.

COMPARATIVE EXAMPLE 1

A polymer membrane was prepared according to Example 3, except that only an acidic polymer of Formula 61 was used. The thickness of the obtained polymer membrane was 35 μm.

COMPARATIVE EXAMPLE 2

A polymer membrane was prepared according to Example 3, except that only an acidic polymer of Formula 62 was used. The thickness of the obtained polymer membrane was 109 μm.

The membrane thickness, proton conductivity using a 4-point probe cell, and methanol permeability of the above polymer membranes were measured at the ambient temperature (25° C., RH=95%). The results are shown in Table 1 below.

TABLE 1

| | Polymer membrane elements | | | | | |
|---|---|---|---|---|---|---|
| | Acid polymer | | Formula 55 | AIBN Amount | | | |
| Examples | Kind | Amount (Parts by weight) | Amount (Parts by weight) | (Parts by weight: compared to Formula 55) | Thickness (μm) | Proton conductivity (S/cm) | Methanol permeability (cm$^2$/sec) |
| Example 3 | Formula 61 | 70 | 30 | 0.084 | 64 | $4.16 \times 10^{-3}$ | $7.55 \times 10^{-8}$ |
| Example 4 | Formula 62 | 70 | 30 | 0.084 | 61 | $1.48 \times 10^{-2}$ | $1.54 \times 10^{-7}$ |
| Example 5 | Formula 62 | 50 | 50 | 0.140 | 51 | $5.17 \times 10^{-2}$ | $1.75 \times 10^{-7}$ |
| Comparative Example 1 | Formula 61 | 100 | — | — | 35 | $9.50 \times 10^{-4}$ | $7.46 \times 10^{-8}$ |
| Comparative Example 2 | Formula 62 | 100 | — | — | 109 | $5.26 \times 10^{-3}$ | $4.21 \times 10^{-7}$ |

As shown in Table 1, Examples 3 to 5, which are the polymer membranes including the cured products of the crosslinkable sulfonated copolymers according to the present invention, have improved proton conductivity while having the same methanol permeability value as before, compared to Comparative Examples 1 and 2, which are the polymer membranes including the conventional acidity polymers.

By using the crosslinkable sulfonated copolymer and the cured product thereof, a polymer electrolyte membrane which can remarkably reduce methanol crossover and maintain superior dimensional stability and ionic conductivity can be obtained by reducing swelling caused by contact with liquid.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method of preparing a crosslinkable sulfonated copolymer comprising:
    condensation polymerizing at least one aromatic diol-, dinitro-, or dihalide-based monomer with an aromatic diol-, dinitro-, or dihalide-based monomer containing a sulfonic acid group or a sulfonate group;
    preparing sulfonated polyarylene ether having a hydroxyl group at ends thereof by adding the hydroxyl group at both ends of the result of the condensation polymerization; and
    covalently bonding the hydroxyl group at the ends of the sulfonated polyarylene ether with a crosslinking derivative.

2. The method of claim 1, wherein the mole ratio between a hydroxyl group of the aromatic diol-based monomer and a hydroxyl group, a nitro group, or a halogen group of the aromatic diol-, dinitro-, or dihalide-based monomer containing a sulfonic acid group or a sulfonate group is in the range of 4.0:6.0 to 6.0:4.0 in the condensation polymerization.

3. The method of claim 1, wherein the mole ratio between the aromatic diol-, dinitro-, or dihalide-based monomer and the aromatic diol-, dinitro-, or dihalide-based monomer containing a sulfonic acid group or a sulfonate group is in the range of 99:1 to 5:95.

4. A method of preparing a sulfonated copolymer cured product, the method comprising forming a curing reaction product by curing a crosslinkable sulfonated copolymer obtained by using the method of claim 1 with a polymerization initiator.

5. The method of claim 4 comprising forming a curing reaction product with a polymerization initiator.

6. The method of claim 5, wherein the polymerization initiator is selected from the group consisting of benzoin ethyl ether, benzyldimethylketal, diethoxyacetophenone, AIBN, and combinations thereof.

7. The method of claim 5, wherein the amount of the polymerization initiator is in the range of 0.01 to 10 parts by weight based on 100 parts by weight of the crosslinkable sulfonated copolymer.

8. The method of claim 1, wherein the crosslinking derivative is selected from the group consisting of (meth)acrylate-based compounds, cinnamate-based compounds, furfuryl-based compounds, epoxy-based compounds, and cyanate-based compounds.

9. A method of preparing a crosslinkable sulfonated copolymer comprising:
    condensation polymerizing an aromatic diol-based monomer with an aromatic diol-, dinitro-, or dihalide-based monomer containing a sulfonic acid group or a sulfonate group to prepare a sulfonated polyarylene ether having a hydroxyl group at ends thereof; and
    reacting the hydroxyl group at the ends of the sulfonated polyarylene ether with a crosslinking derivative.

10. The method of claim 9, wherein the crosslinking derivative is selected from the group consisting of (meth) acrylate-based compounds, cinnamate-based compounds, furfuryl-based compounds, epoxy-based compounds, and cyanate-based compounds.

* * * * *